United States Patent [19]

Hefner, Jr.

[11] 4,435,530

[45] Mar. 6, 1984

[54] HEAT RESISTANT RESIN COMPOSITION

[75] Inventor: Robert E. Hefner, Jr., Lake Jackson, Tex.

[73] Assignee: The Dow Chemical Company, Midland, Mich.

[21] Appl. No.: 436,165

[22] Filed: Oct. 22, 1982

Related U.S. Application Data

[63] Continuation-in-part of Ser. No. 354,829, Mar. 4, 1982, abandoned.

[51] Int. Cl.³ .................... C08L 67/06; C08L 77/12
[52] U.S. Cl. ............................... 523/512; 523/521; 523/527; 525/44; 525/48; 525/421; 525/445
[58] Field of Search ............... 525/48, 44, 421, 445; 523/521, 527, 512

[56] References Cited

U.S. PATENT DOCUMENTS

| | | | |
|---|---|---|---|
| 3,347,806 | 10/1967 | Zimmermann | 525/17 |
| 3,715,330 | 2/1973 | Nogami | 523/521 |
| 3,986,992 | 10/1976 | Canning | 525/44 |
| 4,148,765 | 4/1979 | Nelson | 525/445 |
| 4,167,542 | 9/1979 | Nelson | 525/445 |
| 4,233,432 | 11/1980 | Curtis | 525/49 |
| 4,299,950 | 11/1981 | Iwata | 528/288 |
| 4,319,009 | 3/1982 | Friedli | 525/44 |
| 4,332,931 | 6/1982 | Haegawa | 525/445 |

*Primary Examiner*—John C. Bleutge
*Assistant Examiner*—Patricia Short
*Attorney, Agent, or Firm*—B. G. Colley

[57] ABSTRACT

Heat resistant resin compositions are prepared containing unsaturated polyester resins or polyesteramide resins terminated with a norbornene type group, an ethylenically unsaturated group, and a dicyclopentadiene ester of an unsaturated polycarboxylic acid.

17 Claims, No Drawings

HEAT RESISTANT RESIN COMPOSITION

CROSS REFERENCE TO RELATED APPLICATIONS

This application is a continuation-in-part of Ser. No. 354,829 filed Mar. 4, 1982, abandoned.

BACKGROUND OF THE INVENTION

The present invention relates to curable and cured heat resistant resin compositions comprising (1) unsaturated polyester resins or unsaturated polyesteramides terminally esterified with a norbornene type group, (2) an ethylenically unsaturated compound, and, (3) dicyclopentadiene bis or tris ester of a unsaturated di or tri carboxylic acid.

It is known from U.S. Pat. No. 3,347,806 dated Oct. 17, 1967, that unsaturated polyester resins can be prepared wherein the resins are modified with dicyclopentadiene. However, due to the nature of the disclosed process the polyester resins so prepared have poor mechanical properties, reactivity, and corrosion resistance due to the fact that the resins contain substantial amounts (5 or more percent) of dicyclopentadiene moieties with ether linkages, rather than the more desired ester linkages, as well as Diels-Alder addition products such as endomethylenetetrahydrophthalyl groups.

More recently, in U.S. Pat. No. 4,148,765 (4-10-79) and U.S. Pat. No. 4,233,432 (11-11-80), unsaturated polyesters have been prepared wherein substantially all polyester chains are terminated with a dicyclopentadiene ester moiety. The polyester resins so prepared have improved mechanical properties, reactivity, corrosion resistance, and better economics than the corresponding dicyclopentadiene modified unsaturated polyesters wherein mixtures of dicyclopentadiene etherified and esterified functionality and Diels-Alder addition products are present.

Dicyclopentadiene modified unsaturated polyester compositions containing a vinyl aromatic monomer and a dicyclopentadiene alkenoate having a fast cure time and minimal loss of monomer during curing are disclosed in U.S. Pat. No. 4,167,542 dated 9-11-79. However, said dicyclopentadiene alkenoate is generally a poor solvent for the dicyclopentadiene modified unsaturated polyester alkyd thus high concentrations are required. Furthermore, the corrosion resistance to various aqueous media and solvents as well as the resistance to heat aging are both generally reduced in said polyester compositions.

Although all of those materials have been useful in making products acceptable in the marketplace, there is room for considerable improvement in many of their properties.

SUMMARY OF THE INVENTION

It now has been found that thermosetting resin compositions with improved resistance to heat aging can be prepared using an unsaturated polyester resin or a polyesteramide wherein both resins have been terminally esterified with a norbornene type group such as dicyclopentadiene. The above resins are blended with about 95 to 5 weight percent and preferably 30 to 50 weight percent of a monomer mixture of an ethylenically unsaturated compound and a dicyclopentadiene or polycyclopentadiene bis or tris ester of a polycarboxylic acid.

DETAILED DESCRIPTION OF THE INVENTION

The dicyclopentadiene modified unsaturated polyester resins used herein are known from U.S. Pat. Nos. 4,148,765 and 4,233,432.

The dicyclopentadiene or norbornene modified unsaturated polyesteramides used herein can be prepared by the methods described herein and they are further described in Ser. No. 333,221 filed Dec. 21, 1981 now U.S. Pat. No. 3,399,399.

The polyol used herein is from the class of those having the formula:

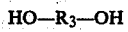

$$HO-R_3-OH$$

wherein $R_3$ is a divalent organic radical selected from the group consisting of alkylene, ether linked alkylene, ether linked arylene, cycloalkylene, polycycloalkylene, bis(alkyl)cycloalkylene, bis(alkyl)polycycloalkylene, and arylene. Mixtures of two or more of such polyols can be used.

Representative of the useful polyols are the diols such as ethylene glycol, propylene glycol, diethylene glycol, dipropylene glycol, dicyclopentadiene dimethanol, bis(hydroxymethyl)norbornane, methyl cyclohexanedimethanol, bis(hydroxypropyl)bisphenol A and other hydroxyalkylated bisphenols. Useful polyols also include pentaerythritol, sorbitol and glycerine.

The polyamines used herein are those having the formula:

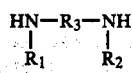

$$\begin{array}{c} HN-R_3-NH \\ | \quad\quad\quad | \\ R_1 \quad\quad R_2 \end{array}$$

wherein $R_1$ and $R_2$ are independently selected from the group consisting of hydrogen, aliphatic, cycloaliphatic and aromatic radicals, or $R_1$ and $R_2$ taken together with the remainder of the molecule form an aliphatic ring; and $R_3$ is a divalent organic radial as herein before described and also including alkylene amino-linked alkylene and alkylene amino-linked cycloalkylene. Mixtures of two or more such polyamines can also be used.

Representative of the useful polyamines are the diamines such as ethylene diamine, propylene diamine, hexane-1,6-diamine, piperazine, 4,4'-methylene-bis(cyclohexylamine), 2,2'-bis(4-aminocyclohexyl)propane, 4,4'-diaminodiphenyl ether, bis(aminomethyl)norbornane, toluene diamine, bis(aminomethyl)dicyclopentadiene and homopiperazine. Typical polyamines are aminoethylpiperazine and diethylenetriamine.

The $\alpha,\beta$-unsaturated polycarboxylic acid is preferably maleic acid, fumaric acid, the anhydride of maleic acid or mixtures of those compounds. Such acids are readily available, have good reactivity with the polyol and/or the diamine, and result in products of good properties. Other less preferred polycarboxylic acids include itaconic acid, citraconic acid, and the like.

Part of the $\alpha,\beta$-unsaturated acid may be replaced with a saturated or aromatic polycarboxylic acid to vary the cross-linking potential and physical properties of the modified polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount to achieve a desired purpose will be known to the skilled worker and can be optimized with simple preliminary experiments.

The total amount of acid varies as a function of the total polyol and/or polyamine, and norbornene ingredients used.

The terminal group used to modify the polyester or polyesteramide is a norbornene radical. Dicyclopentadiene (DCPD) is a most preferred norbornene functional material to be employed in terminating one or both ends of the chain. Polycyclopentadiene (i.e., DCPD oligomers) or dicyclopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

These concentrates have as the main reactive components about 70 to about 90 percent by weight of dicyclopentadiene, about 5 to about 30 percent by weight of the mixed Diels-Alder dimers of diolefins such as butadiene, cis and trans piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

Either the $C_{10}$ concentrate or the relatively pure DCPD may be employed in preparing the modified polyesters or polyesteramides.

The modified polyesters or polyesteramides can be prepared by a variety of techniques. In a preferred method, molten $\alpha,\beta$-unsaturated carboxylic anhydride is partially hydrolyzed with less than the stoichiometric equivalent of water and reacted with the norbornene derivative to form an ester of that derivative and containing unesterified acid and anhydride. This reaction may conveniently be performed in stages whereby reactants are added stepwise, thus controlling reaction exotherms. The product mixture is then reacted with the polyol and/or polyamine to result in the desired modified polyester or polyesteramide.

In a typical procedure, molten maleic anhydride and a fraction of the stoichiometric equivalent of water is maintained at an elevated temperature of from about 60° to 130° C. The initial fractional equivalents of dicyclopentadiene (DCPD) in then added and allowed to react. A second fractional equivalent of water and of DCPD is added and allowed to react. Additional fractional equivalents of DCPD are added and each allowed to react before subsequent addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and/or polyamine. After addition of the polyol and/or polyamine is complete, the reaction can be driven to maximum yield by maintaining or increasing the temperature until the desired acid number has been reached. Typically, acid numbers of 25 to 35 are preferred, although acid numbers that are somewhat higher or lower may be tolerated, and, in some instances, may be desired for certain applications.

In an equally preferred method, molten $\alpha,\beta$-unsaturated carboxylic anhydride is essentially totally hydrolyzed with a stoichiometric or greater equivalent of water and reacted with the norbornene derivative to form an ester of that derivative and containing unesterified acid. This reaction may conveniently be performed in stages whereby reactants are added stepwise thus controlling reaction exotherms. The product mixture is then reacted with the polyol and/or diamine to result in the desired modified polyester or polyesteramide.

In a typical procedure, molten maleic anhydride and the stoichiometric or greater equivalent of water are maintained at an elevated temperature of from about 50° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before subsequent addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and/or polyamine is added to the mixture of esterified DCPD and acid is previously described.

Many other alternate methods will be recognized by the skilled worker. For example, molten maleic anhydride may be added to a mixture of DCPD and water maintained in a reactor. The polyol and/or polyamine is added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

Useful ethylenically unsaturated compounds that can be used herein to cure the resins are styrene, methylstyrene, chlorostyrene, vinyltoluene, t-butyl styrene, vinyl acetate, ethylacrylate, sec-butylacrylate, and the like.

The above compounds are blended with 20 to 80 weight percent of a dicyclopentadiene or polycyclopentadiene bis or tris ester of a polycarboxylic acid having one of the formulae

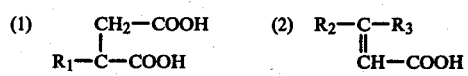

where
$R_1$ is $=CH_2$ or $=C(CH_3)-CH_3$
$R_2$ is hydrogen or $-CH_2-COOH$
$R_3$ is hydrogen when $R_2$ is a $-CH_2-COOH$ group or $-COOH$.

Examples of these esters are the dicyclopentadiene bis and tris esters of maleic, fumaric, itaconic, mesaconic, citraconic, glutaconic, teraconic, and aconitic acids.

These esters are known and can be prepared by the methods set forth in U.S. Pat. No. 2,410,425 (dated 11-5-46). A specific preparation of the fumaric acid esters is set forth below.

PREPARATION OF BIS(DICYCLOPENTADIENYL) FUMARATE

Dicyclopentadiene monoalcohol (4.1 moles 607.66 grams), fumaric acid (2.0 moles 232.14 grams), and tin oxide (SnO) catalyst (0.20 weight percent 1.68 grams) were added to a stirred reactor maintained under a nitrogen atmosphere. The stirred slurry was heated to a 180° C. reaction temperature over a 23 minute period after which time nitrogen sparging (2 liters per minute) and the steam condenser were both started. During the 2.6 hours of reaction at the 180° C. temperature, dicyclopentadiene monoalcohol recovered overhead through the steam condensor and into the Dean Stark trap was recycled back to the reactor. The temperature controller was set at 205° C. and this temperature was achieved 9 minutes later. After 4.5 hours, a total of 71 mls. of water layer and 15 mls. of organic material were collected in the Dean Stark trap. The reactor was cooled to 165° C. and 100 ppm of hydroquinone was added. Bis(dicyclopentadienyl)fumarate in excess of 95 percent purity was recovered as a tacky pale yellow colored solid. Substitution of polycyclopentadiene monoalcohol for dicyclopentadiene monoalcohol provides bis(polycyclopentadienyl)fumarate.

The final blend is a crosslinkable unsaturated polyester or unsaturated polyesteramide terminally esterfied with a norbornene type group, ethylenically unsaturated monomer, and dicyclopentadiene bis or tris ester of an unsaturated di or tri carboxylic acid which is useful to make laminates, castings, or coatings.

The laminates of this invention are made by mixing, into the crosslinkable composition, free radial forming catalysts in known amounts and adding this mixture to a suitable fibrous reinforcement such as asbestos fibers, carbon fibers, fibrous glass, or organic fibers so that the fiber content is in the range from about 5 to about 85 percent by weight.

Examples of these catalysts are benzoyl peroxide, tertiary butyl hydroperoxide, methylethyl ketone peroxide, and the like. It is frequently of value to add accelerators such as cobalt naphthenate, dimethylaniline, and the like.

The resin is rolled, sprayed, or impregnated into the fibrous reinforcement such as fibrous glass and cured in a manner well known in the art. When fibrous glass is used, it can be in any form such as chopped strands, filaments, glass ribbons, glass yarns, or reinforcing mats. The resin may be compounded with solvents, pigments, or other resinous products and cured to form useful coatings in a manner well known in the art.

The following examples serve to support the claims of this invention but are not to be construed as to limit its scope.

EXAMPLE 1

Maleic anhydride (2.0 moles 196.12 grams) was added to a reactor and heated to 70° C. under a nitrogen atmosphere. Water (1.05 moles 18.92 grams) was added followed by dicyclopentadiene concentrate (0.30 mole 40.3 grams) two minutes later. The dicyclopentadiene concentrate contained 1.11% lights, 14.41% cyclopentadiene codimers and diolefin dimers, and 83.94% dicyclopentadiene. Additional dicyclopentadiene concentrate (0.30 mole 40.3 grams) and water (0.35 mole 6.31 grams) were added to the reactor 20 minutes after the initial water addition. A third portion of dicyclopentadiene concentrate (0.30 mole 40.3 grams) was added 15 minutes later. Fifteen minutes later, a final portion of dicyclopentadiene concentrate (0.30 mole 40.3 grams) was added and the temperature controller was set at 110° C. This temperature was achieved 7 minutes later. After 30 minutes, propylene glycol (0.78 mole 59.36 grams) and dipropylene glycol (0.78 mole 104.66 grams) were added to the reactor and the steam condensor was started, nitrogen sparging was increased to 4 liters per minute and the temperature controller was set at 160° C. The 160° C., temperature was reached 11 minutes later. After 2 hours at 160° C., the temperature controller was set at 205° C. and this temperature was achieved 14 minutes later. After 5.5 hours, a total of 35 milliliters of water layer and 7 milliliters of organic material were collected in the Dean Stark trap. The reactor was cooled to 160° C. and 100 ppm of hydroquinone was added. The polyester alkyd was recovered as a clear, pale yellow colored, tacky solid with a final acid number of 24.

The resulting polyester alkyd was formulated to obtain a 33.54 percent styrene—9.46 percent bis(dicyclopentadienyl) fumarate—57.0 percent alkyd solution. This solution was used to determine SPI gel characteristics (84° C.), Brookfield viscosity (25° C.), average Barcol hardness (934-1 scale), and various clear, unfilled castings were made for heat distortion temperature (ASTM D-648), tensile strength, percent elongation, flexural strength, and flexural modulus measurments (ASTM D-658 and D-790). The heat distortion bars were cured at room temperature using 0.1% cobalt naphthenate (6%), 1.0% methylethylketone peroxide, and 0.02% dimethylaniline. The room temperature cured bars were post cured for 2.0 hours at 93° C. The casting for use in tensile and flexural strength evaluation was made using a cure system of 1.0% benzoyl peroxide and 0.01% dimethylaniline at room temperature, followed by post curing for 2.0 hours at 93° C. The results are set forth in Table I.

Control 1

A dicyclopentadiene modified unsaturated polyester was prepared using the method and stoichiometry of Example 1. The resulting polyester alkyd was formulated to obtain a 43.0 percent styrene—57.0 percent alkyd solution. Testing was performed using the method of Example 1. The results are set forth in Table I.

TABLE I

|  | Example 1 | Control 1 |
| --- | --- | --- |
| Brookfield viscosity (cp) | 132.5 | 235 |
| SPI Gel |  |  |
| gel time (min) | 7.5 | 2.5 |
| cure time (min) | 10.7 | 6.4 |
| maximum exotherm (°C.) | 152 | 163 |
| Heat Distortion Temp. (°F.) | 188 | 212 |
| Average Barcol Hardness | 43.7 | 43.9 |
| Tensile strength × $10^3$ (psi) | 4.177 | 4.309 |
| Elongation (%) | 0.91 | 0.89 |
| Flexural Strength × $10^3$ (psi) | 9.011 | 10.221 |
| Flexural Modulus × $10^5$ (psi) | 5.52 | 5.78 |

EXAMPLE 2

A dicyclopentadiene modified unsaturated polyester was prepared using the method of Example 1 with the following changes in stoichiometry:

Each portion of dicyclopentadiene concentrate added to the reactor was increased to 0.50 mole, 67.21 grams. The first portion of water added to the reactor was increased to 1.50 moles, 27.03 grams. The second portion of water added to the reactor was increased to 0.50 mole, 9.01 grams. The overall hydrocarbon reactives efficiency for the reaction was 92.8 percent, and the final acid number of the polyester alkyd was 29.

The resulting polyester alkyd was formulated to obtain a 33.54 percent styrene, 9.46 percent bis(dicyclopentadienyl) fumarate—57.0 percent alkyd solution. Testing was performed using the method of Example 1. The results set forth in Table II.

Control 2

A dicyclopentadiene modified unsaturated polyester was prepared using the method and stoichiometry of Example 2. A portion of the resulting polyester alkyd was formulated to obtain a 43.0 percent styrene, 57.0 percent alkyd solution. Testing was performed using the method of Example 1. The results are set forth in Table II.

Control 3

A portion of the polyester alkyd of Control 2 was formulated to obtain a 33.0 percent styrene—67.0 percent alkyd solution. Testing was performed using the method of Example 1. The mechanical properties were not evaluated. The results are set forth in Table II.

TABLE II

|  | Example 1 | Control 2 | Control 3 |
|---|---|---|---|
| Brookfield viscosity (cp) | 175 | 25 | 75 |
| SPI Gel |  |  |  |
| gel time (min) | 10.9 | 2.6 | 1.8 |
| cure time (min) | 16.6 | 9.0 | 8.2 |
| maximum exotherm (°C.) | 96 | 130 | 124 |
| Heat Distortion Temp. (°F.) | 146 | 184 | 132 |
| Average Barcol Hardness | 42.6 | 39.4 | NA |
| Tensile strength $\times 10^3$ (psi) | 6.878 | 7.966 | NA |
| Elongation (%) | 1.83 | 1.95 | NA |
| Flexural Strength $\times 10^3$ (psi) | 12.209 | 12.155 | NA |
| Flexural Modulus $\times 10^5$ (psi) | 5.50 | 5.38 | NA |

EXAMPLE 3

Maleic anhydride (8.0 moles, 784.48 grams) was added to a reactor and heated to 70° C. under a nitrogen atmosphere. Water (4.20 moles, 75.68 grams) was added followed by dicyclopentadiene concentrate (1.2 moles, 159.15 grams) two minutes later. The dicyclopentadiene concentrate contained 0.31 percent lights, 13.64 percent cyclopentadiene codimers and diolefin dimers and 86.05 percent dicyclopentadiene. A maximum exotherm of 118° C. resulted five minutes later. Additional dicyclopentadiene concentrate (1.2 moles, 159.15 grams) and water (1.4 moles, 25.23 grams) were added to the reactor twenty minutes after the initial water addition. A third portion of dicyclopentadiene concentrate (1.2 moles, 159.15 grams) was added fifteen minutes later. Fifteen minutes later, a final aliquot of dicyclopentadiene concentrate (1.2 moles, 159.15 grams) was added and the temperature controller was set at 110° C. This temperature was achieved one minute later. After 30 minutes, propylene glycol (6.24 moles, 474.86 grams) was added to the reactor and the steam condensor was started, nitrogen sparging was increased to 4 liters per minute, and the temperature controller was set at 160° C. The 160° C. temperature was reached seventeen minutes later. After two hours at 160° C., the temperature controller was set at 205° C. and this temperature was achieved thirty five minutes later. After 3.34 hours, a total of 173 milliliters of water layer and 22.0 milliliters of organic material were collected in the Dean Stark trap. The reactor was cooled to 168° C. and 100 ppm of hydroquinone was added. The polyester alkyd was recovered as a clear, light yellow colored, tacky solid with a final acid number of 25.7.

A portion of the resulting polyester alkyd was formulated to obtain a 33.54 percent styrene—9.46 percent bis(dicyclopentadienyl) fumarate—57.0 percent alkyd solution. This solution was used to prepare a laminate in accordance with the following standard hand layup procedure:

A sheet of 0.005 inch Mylar film was attached to a smooth flat surface with masking tape. An area of sufficient size was covered with a thin coating of the laminating resin and a surface C-veil from Owens Corning Fiberglas Corporation was laid down and smoothed out. Additional resin was applied and the first layer of 1.5 ounce chopped fiberglass mat having a surface coupling agent was applied. This was carefully rolled down with a serrated aluminum roller to exclude all trapped air. Resin was added, followed by a second layer of 1.5 ounce chopped fiberglass mat. Rolling again removed any entrapped air. After adding additional resin, the final surface was applied and smoothed out. Straight steel rails of $\frac{1}{4}$ inch square in cross-section were placed along all four sides of the laminate. A cover sheet of Mylar was rolled onto a 2-inch diameter tube long enough to bridge the rails. Additional resin was added to the laminate and the Mylar was rolled out over it. The Mylar was then stretched tightly and taped down. Any entrapped air or excess resin was squeezed out of the laminate using a wooden tongue depressor. The laminate was left until the polymerization exotherm had subsided and cooling to ambient temperature had occurred. The laminate was removed and postcured at 93° C. (200° F.) for 2.0 hours.

A cure system of 1.0 percent methylethylketone peroxide and 0.3 percent cobalt naphthenate (6.0 percent) was used for the laminate. The styrene-bis (dicyclopentadienyl)fumarate-polyester alkyd solution was retarded with 100 ppm of p-benzoquinone prior to lamination. This was necessary to prevent gellation during the laminate preparation.

Standard tensile flexural, and heat distortion temperature test pieces were cut from the laminate and sorted to provide five serialized groups containing the following: 6 tensile pieces, 5 flexural pieces, 2 heat distortion temperature pieces. A sixth group consisting of only two heat distortion temperature pieces was also prepared. Four of the groups of test pieces plus the sixth group of only heat distortion temperature test pieces were placed on flat aluminum trays. The trays were suspended in a vented forced-air convection-type oven at room temperature and the temperature controller was then set at 200° C. This temperature was maintained for 2.0 hours after which time the temperature controller was set at the 240° C. test temperature. The test pieces of the fifth group prepared from the laminate were used as standards. (No exposure to the 240° C. test temperature).

All test pieces were visually inspected after removal from the test. Mechanical properties were determined using an Instron machine with standard test methods (D-638 and D-790) on both the heat aged and non-heat aged test pieces. Heat distortion temperature (269 psi) of the laminate test pieces was determined using standard test methods (D-648) with an Aminco Plastic Deflection Tester (American Instrument Co.). All Barcol hardness values are on the 934-1 scale. Weight loss (percent) was determined by weighing various test pieces both before and after the thermal exposure. The results are reported in Table III. In Table III, designation A, B, and C, under percent weight loss are for a tensile test piece, a flexural test piece, and a heat distortion temperature test piece, respectively.

TABLE III

| | Hours of Exposure to 240° C.* | | | | |
|---|---|---|---|---|---|
| | None | 24 | 48 | 120 | 312 | 720 |
| Average Barcol Hardness | 49.1 | NA | 50.3 | 50.4 | 50.4 | 50.2 |
| Weight loss (%) | | | | | | |
| A | 0 | NA | −3.12 | −4.67 | −7.73 | −11.44 |
| B | 0 | NA | −3.44 | −5.57 | −8.76 | −12.45 |
| C | 0 | −2.46 | −3.77 | −6.21 | −9.66 | −12.72 |
| Tensile strength × 10³ (psi) | 8.664 | NA | 7.631 | 8.170 | 7.575 | 7.612 |
| Elongation (%) | 1.77 | NA | 2.07 | 1.97 | 1.72 | 1.46 |
| Flexural strength × 10³ (psi) | 10.460 | NA | 10.946 | 10.435 | 12.329 | 10.543 |
| Flexural Modulus × 10⁵ (psi) | 8.74 | NA | 6.48 | 6.07 | 6.16 | 4.38 |
| Heat Distortion Temperature (°F.) | 274 | 349.5 | 366 | 335 | 306.5 | 313 |
| Delamination | | | none | | | |

*All samples darken after 24 hours of exposure, otherwise no other visually observable changes occurred.

Control 4

A portion of the polyester alkyd of Example 3 was formulated to obtain a 43.0 percent styrene—57.0 percent alkyd solution. Laminate preparation and testing was performed using the method of Example 3. Exposure to the 240° C. test temperature was simultaneous with that of Example 3. The results are reported in Table IV.

TABLE IV

| | Hours of Exposure to 240° C.* | | | | |
|---|---|---|---|---|---|
| | None | 24 | 48 | 120 | 312 | 720 |
| Average Barcol Hardness | 49.4 | NA | 50.1 | 50.6 | 49.2 | 44.2 |
| Weight loss (%) | | | | | | |
| A | 0 | NA | −3.49 | −5.76 | NA | −12.26 |
| B | 0 | NA | −3.80 | −5.82 | −8.92 | −12.52 |
| C | 0 | −2.94 | −4.17 | −6.45 | −9.44 | −12.97 |
| Tensile strength × 10³ (psi) | 8.498 | NA | 8.302 | 8.355 | 8.114 | 7.838 |
| Elongation (%) | 1.76 | NA | 1.80 | 1.84 | 1.51 | 2.11 |
| Flexural strength × 10³ (psi) | 12.165 | NA | 13.409 | 11.434 | 11.374 | 11.965 |
| Flexural Modulus × 10⁵ (psi) | 7.62 | NA | 6.56 | 6.41 | 6.25 | 3.41 |
| Heat Distortion Temperature (°F.) | 256 | 320 | 371.5 | 313 | 256 | 212 |
| Delamination | 0 | slight | slight | moderate | moderate | moderate |

*All samples darken after 24 hours of exposure.

The use of bis(dicyclopentadienyl)fumarate in Example 3 has significantly decreased percent weight loss, prevented long-term loss of Barcol hardness, increased and stabilized the heat distortion temperature, and totally prevented delamination, as compared to Control 4.

EXAMPLE 4

Maleic anhydride (7.0 moles 686.42 grams) was added to a reactor and heated to 120° C. under a nitrogen atmosphere. Water (7.1 moles 127.94 grams) was added to the reactor. A maximum exotherm of 144° C. resulted two minutes later followed a decrease in the reaction temperature to 122° C. fifteen minutes after the initial water addition. At this time, dicyclopentadiene concentrate (2.10 moles 278.70 grams) was added. A maximum exotherm of 125° C. resulted three minutes later with the 120° C. temperature being reestablished five minutes after the initial dicyclopentadiene concentrate addition. The dicyclopentadiene concentrate contained 0.31 percent lights, 13.64 percent cyclopentadiene codimers and diolefin dimers, and 86.05 percent dicyclopentadiene. Fifteen minutes after the initial addition of dicyclopentadiene concentrate, a second portion of dicyclopentadiene concentrate (2.10 moles 278.70 grams) was added. Fifteen minutes later, a final aliquot of dicyclopentadiene concentrate (2.10 moles 278.70 grams) was added and the temperature controller was maintained at 120° C. This temperature was reestablished four minutes later. After 30 minutes, propylene glycol (3.78 moles 287.66 grams) and anhydrous piperazine (0.42 moles 36.18 grams) were added to the reactor and the steam condensor was started, nitrogen sparging was increased to 4 liters per minute, and the temperature controller was set at 160° C. The 160° C. temperature was reached twenty-one minutes later. After two hours at 160° C., the temperature controller was set at 205° C., and this temperature was achieved fifteen minutes later. After 9.25 hours, a total of 167.5 milliliters of water layer and 52.5 milliliters of organic material were collected in the Dean Stark trap. The reactor was cooled to 165° C. and 100 ppm of hydroquinone was added. The polyesteramide alkyd was recovered as a clear, light yellow colored solid with a final acid number of 28.1.

The resulting polyesteramide alkyd was formulated to obtain a 33.0 percent styrene—10.0 percent bis(dicyclopentadienyl)fumarate—57.0 percent alkyd solution. This solution was used to prepare a laminate in accordance with the standard hand layup procedure taught in Example 3. The room temperature cure system used for the laminate was the same as that taught in Example 3. Mechanical property testing and 240° C. heat aging were completed using the methods taught in Example 3. The results are reported in Table V wherein the designations A, B, and C under percent weight loss are as hereinbefore defined.

TABLE V

| | Hours of Exposure to 240° C.* | | | | |
|---|---|---|---|---|---|
| | None | 24 | 48 | 120 | 312 | 720 |
| Average Barcol Hardness | 49.4 | NA | 50.8 | NA | 51.5 | 49.1 |
| Weight loss (%) | | | | | | |
| A | 0 | −2.49 | −3.55 | −3.91 | −6.95 | −9.05 |
| B | 0 | −1.87 | −2.32 | −2.80 | −5.93 | −8.77 |
| C | 0 | −2.06 | −2.95 | −3.44 | −6.62 | −9.33 |
| Tensile strength × 10³ (psi) | 7.247 | NA | 7.110 | NA | 7.268 | 7.193 |
| Elongation (%) | 2.16 | NA | 2.13 | NA | 1.91 | 2.01 |
| Flexural strength × 10³ (psi) | 13.699 | NA | 12.259 | NA | 10.536 | 11.183 |
| Flexural Modulus × 10⁵ (psi) | 7.94 | NA | 6.56 | NA | 5.84 | 5.40 |
| Heat Distortion Temperature (°F.) | 342 | NA | 402.5 | NA | 480.5 | NA |
| Delamination | 0 | none | none | none | none | none |

*All samples darken after 24 hours of exposure, otherwise no other visually observable changes occurred.

CONTROL 5

A dicyclopentadiene unsaturated polyesteramide alkyd was synthesized using the reactants, stoichiometry and methods of Example 4 (final acid number=28.4). A portion of the polyesteramide alkyd was formulated to obtain a 70.0 percent dicyclopentadiene acrylate—30.0 percent alkyd solution. Laminate preparation and testing was performed using the method of Example 3.

Exposure to the 240° C. test temperature was simultaneous with that of Example 4. The results are reported in Table VI.

TABLE VI

| | Hours of Exposure to 240° C.* | | | | | |
|---|---|---|---|---|---|---|
| | None | 24 | 48 | 120 | 312 | 720 |
| Average Barcol Hardness | 49.5 | NA | 50.6 | NA | 36.5 | 2.8 |
| Weight loss (%) | | | | | | |
| A | 0 | −1.48 | −2.04 | −2.57 | −6.70 | −20.41 |
| B | 0 | −1.38 | −1.91 | −2.21 | −7.36 | −22.19 |
| C | 0 | −1.61 | −2.06 | −2.35 | −7.84 | −21.97 |
| Tensile strength × 10³ (psi) | 6.562 | NA | 6.676 | NA | 5.690 | 2.884 |
| Elongation (%) | 1.62 | NA | 2.54 | NA | 2.07 | 1.16 |
| Flexural strength × 10³ (psi) | 11.987 | NA | 11.683 | NA | 7.372 | 2.186 |
| Flexural Modulus × 10⁵ (psi) | 7.57 | NA | 5.06 | NA | 3.97 | 1.85 |
| Heat Distortion Temperature (°F.) | 214 | NA | 335.5 | NA | 349.5 | 296.5 |
| Delamination | 0 | none | slight surface crazing | moderate surface crazing | severe surface crazing hairline cracks perpendicular to plane of glass mats. | same as at 312 hrs. |

*All samples darken after 24 hours of exposure.

The use of bis(dicyclopentadienyl)fumarate in Example 4 has significantly decreased percent weight loss; prevented loss of Barcol hardness; increased retention of tensile strength, flexural strength and flexural modulus; and totally prevented crazing and cracking as compared to Control 5.

Control 6

A portion of the polyesteramide alkyd of Control 5 was formulated to obtain a 43.0 percent styrene—57.0 percent alkyd solution. Laminate preparation and testing was performed using the method of Example 3. Exposure to the 240° C. test temperature was simultaneous with that of Example 4. The results are reported in Table VII.

TABLE VII

| | Hours of Exposure to 240° C.* | | | | | |
|---|---|---|---|---|---|---|
| | None | 24 | 48 | 120 | 312 | 720 |
| Average Barcol Hardness | 48.9 | NA | 50.8 | NA | 50.7 | 49.4 |
| Weight loss (%) | | | | | | |
| A | 0 | −2.40 | −3.28 | −3.74 | −6.68 | −8.65 |
| B | 0 | −2.01 | −2.80 | −3.25 | −6.34 | −8.47 |
| C | 0 | −2.49 | −3.41 | −3.92 | −6.71 | −8.90 |
| Tensile strength × 10³ (psi) | 8.290 | NA | 7.947 | NA | 7.569 | 8.219 |
| Elongation (%) | 1.97 | NA | 1.73 | NA | 1.26 | 1.53 |
| Flexural strength × 10³ (psi) | 13.347 | NA | 11.476 | NA | 11.384 | 12.191 |
| Flexural Modulus × 10⁵ (psi) | 7.94 | NA | 6.39 | NA | 6.24 | 5.72 |
| Heat Distortion Temperature (°F.) | 278.5 | NA | 357 | NA | 368.5 | 348.5 |

TABLE VII-continued

| | Hours of Exposure to 240° C.* | | | | |
|---|---|---|---|---|---|
| | None | 24 | 48 | 120 | 312 | 720 |
| Delamination | 0 | none | none | none | none | none |

*All samples darken after 24 hours of exposure, otherwise no other visually observable changes occurred.

The use of bis(dicyclopentadienyl)fumarate in Example 4 has prevented loss percent elongation and significantly increased the heat distortion temperature as compared to Control 6.

EXAMPLE 5

A dicyclopentadiene modified unsaturated polyesteramide was synthesized using the method of Example 4. A portion of the resulting polyesteramide alkyd was formulated to obtain a 33.0 percent styrene—10.0 percent bis(dicyclopentadienyl)fumarate—57.0 percent alkyd solution. This solution was used to prepare a clear, unfilled casting. A cure system of 1.0 percent benzoyl peroxide and 0.01 percent N,N-dimethylaniline was used at room temperature (25° C.) followed by post curing at 93° C. (200° F.) for 2.0 hours. Two pairs of standard heat distortion temperature test pieces were cut from the clear, unfilled casting. One pair of heat distortion temperature test pieces were placed on a flat aluminum tray which was then suspended in a vented forced-air convection-type oven at room temperature and the temperature controller was then set at 200° C. This temperature was maintained for 2.0 hours after which time the temperature controller was set at the 240° C. test temperature. The pair of test pieces were removed after 720 hours of exposure. The other pair of test pieces were used as standards. (No exposure to the 240° C. test temperature). Heat distortion temperature of the test pieces was determined using the method of Example 3. The results are reported in Table VIII.

Control 7

A portion of the polyesteramide alkyd of Example 5 was formulated to obtain a 43.0 percent styrene—57.0 percent alkyd solution. Clear casting preparation and testing was performed using the method of Example 5. Exposure to the 240° C. test temperature was simultaneous with that of Example 5. The results are reported in Table VIII.

Control 8

A portion of the polyesteramide alkyd of Example 5 was formulated to obtain a 43.0 percent vinyl toluene—57.0 percent alkyd solution. Clear casting preparation and testing was performed using the method of Example 5. Exposure to the 240° C. test temperature was simultaneous with that of Example 5. The results are reported in Table VIII.

TABLE VIII

| | Heat Distortion Temperature (°F.) | |
|---|---|---|
| | 0 hours | 720 hours |
| Example 5 | 219 | 354 |
| Control 7 | 232 | 293 |
| Control 8 | 217 | 284 |

The use of bis(dicyclopentadienyl)fumarate in Example 5 has significantly increased the heat distortion temperature after the thermal exposure as compared to Controls 7 and 8.

EXAMPLE 6

Maleic anhydride (7.0 moles 686.42 grams) was added to a reactor and heated to 100° C. under a nitrogen atmosphere. Water (7.1 moles 127.94 grams) was added to the reactor. A maximum exotherm of 134° C. resulted two minutes later followed by a decrease in the reaction temperature to 121° C. fifteen minutes after the initial water addition. At this time, dicyclopentadiene (2.10 moles 277.64 grams) of 97 percent purity was added. A maximum exotherm of 125° C. resulted two minutes later with a 120° C. temperature being reestablished four minutes after the initial dicyclopentadiene addition. Fifteen minutes after the initial addition of dicyclopentadiene, a second portion of dicyclopentadiene (2.10 moles 277.64 grams) was added. Fifteen minutes later, a final aliquot of dicyclopentadiene (2.10 moles 277.64 grams) was added and the temperature controller was maintained at 120° C. This temperature was reestablished three minutes later. After 30 minutes, propylene glycol (4.20 moles 319.62 grams) was added to the reactor and the steam condensor was started, nitrogen sparging was increased to 0.5 liters per minute, and the temperature controller was set at 160° C. The 160° C. temperature was reached thirty-one minutes later. After two hours at 160° C., the temperature controller was set at 205° C., and this temperature was achieved thirty-two minutes later. After 6.1 hours, a total of 141.5 milliliters of water layer and 14 milliliters of organic material were collected in the Dean Stark trap. The reactor was cooled to 165° C. and 100 ppm of hydroquinone was added. The polyester alkyd was recovered as a clear, light yellow colored solid with a final acid number of 26.8.

A portion of the modified unsaturated polyester alkyd, bis(dicyclopentadienyl)fumarate, and styrene were formulated as follows to provide the indicated weight percent of each component:

| Modified Polyester Alkyd (grams/wt. %) | bis(Dicyclopentadienyl) fumarate (grams/wt. %) | Styrene (grams/wt. %) |
|---|---|---|
| Formulation 1: | | |
| 199.5/57.0 | 35.0/10.0 | 115.5/33.0 |
| Formulation 2: | | |
| 140.0/40.0 | 70.0/20.0 | 140.0/40.0 |

These solutions were used to determine SPI gel characteristics (84° C.) and Brookfield viscosity (25° C.). The results are reported in Table IX.

Control 9

A portion of the modified unsaturated polyester alkyd of Example 6, dicyclopentadiene acrylate, and styrene were formulated as follows to provide the indicated weight percent of each component:

| Modified Polyester Alkyd (grams/wt. %) | Dicyclopentadiene acrylate (grams/wt. %) | Styrene (grams/wt. %) |
|---|---|---|
| Formulation 1: | | |
| 199.5/57.0 | 35.0/10.0 | 115.5/33.0 |
| Formulation 2: | | |
| 140.0/40.0 | 70.0/20.0 | 140.0/40.0 |

These solutions were used to determine SPI gel characteristics (84° C.) and Brookfield viscosity (25° C.). The results are reported in Table IX.

Control 10

A portion of the modified unsaturated polyester alkyd of Example 6 and styrene were formulated to provide a 43.0 weight percent styrene [150.5 grams]—57.0 weight percent alkyd [199.5 grams] solution. This solution was used to determine SPI gel characteristics (84° C.) and Brookfield viscosity (25° C.). The results are reported in Table IX.

TABLE IX

| | Brookfield Viscosity (cp) | SPI Gel | | |
|---|---|---|---|---|
| | | gel time (min) | cure time (min) | max. exotherm (°C.) |
| Example 6 Formulation 1 | 103 | 3.1 | 5.4 | 210 |
| Example 6 Formulation 2 | 37 | 3.4 | 6.7 | 208 |
| Control 9 Formulation 1 | 71.5 | 4.3 | 6.9 | 210 |
| Control 9 Formulation 2 | 20 | 5.2 | 8.9 | 222 |
| Control 10 | 37 | 3.6 | 6.1 | 219 |

The use of bis(dicyclopentadienyl)fumarate in Example 6—Formulation 1 and Example 6—Formulation 2 provided significantly faster gel and cure times as compared to Control 9—Formulation 1 and Control 9—Formulation 2, respectively.

EXAMPLE 7

The remaining portion of the formulation of Example 6—Formulation 1 was used to prepare a clear, unfilled casting. A cure system of 1.0 percent benzoyl peroxide and 0.01 percent N,N-dimethylaniline was used at room temperature (25° C.) followed by post curing at 100° C. (212° F.) for 2.0 hours. Standard flexural and heat distortion temperature test pieces were cut from the clear, unfilled casting and sorted to provide five serialized groups containing 3 flexural pieces and 2 heat distortion temperature pieces. A sixth group consisting of only heat distortion temperature pieces was also prepared. Four of the groups of test pieces plus the sixth group of only heat distortion temperature test pieces were placed on a flat aluminum tray. The tray was suspended in a vented forced-air convection-type oven maintained at 100° C. for 2.0 hours, 150° C. for 2.0 hours then 200° C. for 2.0 hours. The temperature controller was then set at 220° C. and this temperature was maintained for the first 72 hours of the test, after which time, the temperature was increased to 240° C. and maintained throughout the remaining test. The test pieces of the fifth group prepared from the clear, unfilled casting were used as standards. (No exposure to the 240° C. test temperature).

All test pieces were visually inspected after removal from the test. Mechanical properties were determined using an Instron machine with standard test methods (ASTM D-790) on both the heat aged and non-heat aged test pieces. Heat distortion temperature of the clear, unfilled casting test pieces was determined using standard test methods (ASTM D-648) with an Aminco Plastic Deflection Tester (American Instrument Co.). All Barcol hardness values are on the 934-1 scale. Weight less (percent) was determined by weighing various test pieces both before and after the thermal exposure. The results are reported in Table X. In Table X, designation B and C under percent weight loss are averaged for the flexural test pieces and heat distortion temperature test pieces, respectively.

TABLE X

| | Hours of Thermal Exposure | | | | | |
|---|---|---|---|---|---|---|
| | None | 24 | 72 | 120 | 336 | 720 |
| Average Barcol Hardness | 46.9 | 48.6 | 50.3 | NA | 49.7 | 48.1 |
| Weight loss (%) | | | | | | |
| B | 0 | −0.66 | −1.16 | −2.49 | −5.43 | −8.42 |
| C | 0 | −0.65 | −1.23 | −2.68 | −5.80 | −8.65 |
| Flexural Strength $10^3$ (psi) | 10.494 | 15.183 | 16.791 | NA | 6.960 | 7.076 |
| Flexural Modulus $10^5$ (psi) | 7.06 | 6.19 | 6.14 | NA | 6.27 | 6.00 |
| Heat Distortion Temperature (°F.) | 225 | 294 | 314 | 393 | 414 | 376 |
| Visual Observations | — | test samples darken | — | — | — | very slight surface crazing |

Control 11

The remaining portion of the formulation of Control 9—Formulation 1 was used to prepare a clear, unfilled casting, then test pieces, using the method of Example 7. Testing was performed using the method of Example 7. The thermal exposure was simultaneous with that of Example 7. The results are reported in Table XI.

TABLE XI

| | Hours of Thermal Exposure | | | | | |
|---|---|---|---|---|---|---|
| | None | 24 | 72 | 120 | 336 | 720 |
| Average Barcol Hardness | 48.2 | 49.2 | 48.7 | NA | 48.3 | 43.3 |
| Weight loss (%) | | | | | | |
| B | 0 | 0.61 | −1.14 | −2.45 | −5.10 | −8.19 |
| C | 0 | 0.61 | −1.20 | −2.61 | −5.34 | −8.47 |
| Flexural Strength $10^3$ (psi) | 9.872 | 15.709 | 15.366 | NA | 6.753 | 3.254 |
| Flexural Modulus $10^5$ (psi) | 6.75 | 6.18 | 5.84 | NA | 6.41 | 2.95 |
| Heat Distortion Temperature (°F.) | 229 | 285 | 322 | 374 | 442 | 390 |
| Visual Observations | — | test samples darken | — | — | — | very slight surface crazing |

The use of bis(dicyclopentadienyl)fumarate in Example 7 has significantly decreased long-term loss of Barcol hardness, flexural strength and flexural modulus, as compared to Control 11, wherein dicyclopentadiene acrylate was used.

Control 12

The remaining portion of the formulation of Control 10 was used to prepare a clear, unfilled casting, then test pieces, using the method of Example 7. Testing was performed using the method of Example 7. The thermal exposure was simultaneous with that of Example 7. The results are reported in Table XII.

TABLE XII

| | Hours of Thermal Exposure | | | | |
|---|---|---|---|---|---|
| | None | 24 | 72 | 120 | 336 | 720 |
| Average Barcol Hardness | 47.0 | 49.2 | 50.1 | NA | 48.3 | 43.6 |
| Weight loss (%) | | | | | | |
| B | 0 | −0.73 | −1.32 | −2.80 | −5.88 | −8.67 |
| C | 0 | −0.72 | −1.61 | −3.03 | −6.21 | −9.11 |
| Flexural Strength 10³ (psi) | 12.715 | 17.680 | 14.968 | NA | 6.991 | 2.822 |
| Flexural Modulus 10⁵ (psi) | 6.52 | 6.47 | 6.18 | NA | 6.00 | 2.60 |
| Heat Distortion Temperature (°F.) | 235 | 276 | 299 | 328 | 338 | 304 |
| Visual Observations | — | test samples darken | — | — | — | very slight surface crazing |

The use of bis(dicyclopentadienyl)fumarate in Example 7 has significantly decreased long-term loss of Barcol hardness, flexural strength, flexural modulus, and heat distortion temperature as compared to Control 12.

I claim:

1. A curable resinous composition comprising
   (A) about 5 to 95 weight percent of an unsaturated polyester resin or an unsaturated polyesteramide resin, wherein said resins are terminated with a norbornene functional material so that substantially all the norbornene functional moieties are esterified
   (B) about 95 to 5 weight percent of an unsaturated mixture consisting of 20 to 80 weight percent of an ethylenically unsaturated compound and 80 to 20 weight percent of a dicyclopentadiene or polycyclopentadiene bis or tris ester of a unsaturated polycarboxylic acid having one of the formulae

where
$R_1$ is $=CH_2$ or $=C(CH_3)-CH_3$
$R_2$ is hydrogen or $-CH_2-COOH$
$R_3$ is hydrogen when $R_2$ is a $-CH_2-COOH$ group, or $-COOH$.

2. The composition of claim 1 wherein the bis ester is bis(dicyclopentadienyl)fumarate.

3. The composition of claim 1 wherein the norbornene functional material is dicyclopentadiene.

4. The composition of claim 1 wherein the norbornene functional material is a dicyclopentadiene concentrate.

5. The composition of claim 1 wherein the norbornene functional material is a polycyclopentadiene.

6. A cured fibrous composition made with the composition of claim 1.

7. The composition of claim 1, wherein the ethylenically unsaturated compound is styrene.

8. The cured fibrous composition of claim 6 wherein the fiber content is in the range from about 5 to about 85 percent by weight.

9. The composition of claim 8 wherein the fiber is selected from the group consisting of asbestos, glass, carbon and organic fibers.

10. A curable resinous composition comprising
    (A) about 5 to 95 weight percent of an unsaturated polyesteramide resin, wherein said resin is terminated with a norbornene functional material so that substantially all the norbornene functional moieties are esterified
    (B) about 95 to 5 weight percent of an unsaturated mixture consisting of 20 to 80 weight percent of a ethylenically unsaturated compound and 80 to 20 weight percent of a dicyclopentadiene or polycyclopentadiene bis or tris ester of a polycarboxylic acid having one of the formulae

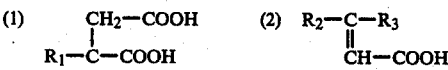

where
$R_1$ is $=CH_2$ or $=C(CH_3)-CH_3$
$R_2$ is hydrogen, or $-CH_2-COOH$
$R_3$ is hydrogen when $R_2$ is a $-CH_2-COOH$ group, or $-COOH$.

11. The composition of claim 10 wherein the bis ester is (dicyclopentadienyl) fumarate.

12. The composition of claim 10 wherein the norbornene functional material is dicyclopentadiene.

13. The composition of claim 10 wherein the norbornene functional material is a dicyclopentadiene concentrate.

14. The composition of claim 10 wherein the norbornene functional material is a polycyclopentadiene.

15. A cured fibrous composition made with the composition of claim 10.

16. The cured fibrous composition of claim 15 wherein the fiber content is in the range from about 5 to about 85 percent by weight.

17. The composition of claim 16 wherein the fiber is selected from the group consisting of asbestos, glass, carbon, and organic fibers.

* * * * *